United States Patent
Quinlan et al.

(10) Patent No.: US 11,901,726 B2
(45) Date of Patent: Feb. 13, 2024

(54) RESTORATION MANAGEMENT

(71) Applicant: S&C Electric Company, Chicago, IL (US)

(72) Inventors: Michael Quinlan, Chicago, IL (US); Boris Marendic, Chicago, IL (US); Yoav Sharon, Evanston, IL (US)

(73) Assignee: S&C Electric Company, Chicago, IL (US)

( * ) Notice: Subject to any disclaimer, the term of this patent is extended or adjusted under 35 U.S.C. 154(b) by 387 days.

(21) Appl. No.: 17/489,935

(22) Filed: Sep. 30, 2021

(65) Prior Publication Data

US 2022/0109295 A1  Apr. 7, 2022

Related U.S. Application Data

(60) Provisional application No. 63/086,219, filed on Oct. 1, 2020.

(51) Int. Cl.
*H02H 7/26* (2006.01)
*H02J 13/00* (2006.01)
(Continued)

(52) U.S. Cl.
CPC ............. *H02H 7/26* (2013.01); *G05B 19/042* (2013.01); *H02J 3/0012* (2020.01); *H02J 3/381* (2013.01);
(Continued)

(58) Field of Classification Search
CPC .... H02H 7/26; H02J 13/00002; H02J 3/0012; G05B 19/042; G05B 2219/2639; G05B 15/02
(Continued)

(56) References Cited

U.S. PATENT DOCUMENTS

| 6,347,027 B1 * | 2/2002 | Nelson | H02H 3/006 |
| | | | 361/64 |
| 8,666,558 B2 * | 3/2014 | Wang | H02J 13/0004 |
| | | | 700/286 |

(Continued)

FOREIGN PATENT DOCUMENTS

| CA | 3130310 A1 * | 3/2022 | ........... G01R 31/086 |
| CA | 3135642 A1 * | 4/2022 | ............. H01H 9/167 |

(Continued)

OTHER PUBLICATIONS

International Search Report and Written Opinion for International Application No. PCT/US2021/052763 dated Feb. 28, 2022. (18 pages).

*Primary Examiner* — Ronald D Hartman, Jr.

(57) ABSTRACT

A system and method for controlling an operation of devices in a power distribution network. The method determines that there is a power loss in the network as a result of a fault and one or more teams is not receiving power and performs a switching process in switching devices to prevent fault current from flowing to the fault. The method initiates a power restoration process to control the open and closed status of switching devices to isolate the fault and performs the power restoration process by the leader device in a division that the fault is occurring that includes opening and closing switching devices so that power is provided to all of the teams except the team that the fault is in. The method reconfigures the divisions based on which switching devices are now open and selects new leader devices based on the reconfiguration of the divisions.

20 Claims, 9 Drawing Sheets

(51) Int. Cl.
  *G05B 19/042* (2006.01)
  *H02J 3/00* (2006.01)
  *H02J 3/38* (2006.01)
  *H02J 3/46* (2006.01)

(52) U.S. Cl.
  CPC ............... *H02J 3/388* (2020.01); *H02J 3/46* (2013.01); *H02J 3/472* (2020.01); *H02J 13/00002* (2020.01); *H02J 13/00034* (2020.01); *G05B 2219/2639* (2013.01)

(58) Field of Classification Search
  USPC ........................................................ 700/292
  See application file for complete search history.

(56) References Cited

U.S. PATENT DOCUMENTS

| | | | | |
|---|---|---|---|---|
| 8,872,667 | B2 * | 10/2014 | Bhageria | H02J 3/0073 700/286 |
| 10,811,876 | B2 * | 10/2020 | Klocman | G05B 15/02 |
| 2004/0153215 | A1 * | 8/2004 | Kearney | H02H 3/063 700/293 |
| 2009/0112375 | A1 * | 4/2009 | Popescu | H02H 1/0092 700/286 |
| 2011/0029148 | A1 * | 2/2011 | Yang | G05F 1/66 700/297 |
| 2011/0066296 | A1 | 3/2011 | Nelson et al. | |
| 2012/0265360 | A1 * | 10/2012 | Smit | H02H 7/262 700/293 |
| 2015/0134135 | A1 * | 5/2015 | Wong | G05B 15/02 700/295 |
| 2015/0293550 | A1 | 10/2015 | Yang et al. | |
| 2016/0179118 | A1 | 6/2016 | Song et al. | |
| 2017/0358914 | A1 * | 12/2017 | Chaiquin | H02J 13/00036 |
| 2018/0316184 | A1 * | 11/2018 | Hong | H02J 3/388 |
| 2020/0076183 | A1 * | 3/2020 | Montenegro | H02H 7/30 |
| 2020/0119546 | A1 | 4/2020 | Quinlan | |
| 2021/0091557 | A1 * | 3/2021 | Meisinger | H02H 3/38 |
| 2021/0273451 | A1 * | 9/2021 | Bishop | H02H 3/063 |
| 2022/0103010 | A1 * | 3/2022 | Quinlan | H02J 3/0073 |
| 2022/0109295 | A1 * | 4/2022 | Quinlan | H02J 3/472 |
| 2022/0123589 | A1 * | 4/2022 | Fan | H02J 3/00125 |
| 2022/0166214 | A1 * | 5/2022 | Batra | H02H 3/087 |
| 2023/0052174 | A1 * | 2/2023 | Meisinger, Sr. | H02H 1/0007 |

FOREIGN PATENT DOCUMENTS

| | | | | |
|---|---|---|---|---|
| CN | 103797464 A | * | 5/2014 | ........... G01R 19/165 |
| CN | 108376974 A | * | 8/2018 | ............. H02H 3/063 |
| CN | 109193582 A | * | 1/2019 | ............... H02H 7/26 |
| WO | 2020167718 A1 | | 8/2020 | |

* cited by examiner

RESTORATION MANAGEMENT

CROSS-REFERENCE TO RELATED APPLICATION

This application claims the benefit of priority from the United States Provisional Application No. 63/086,219, filed on Oct. 1, 2020, the disclosure of which is hereby expressly incorporated herein by reference for all purposes.

BACKGROUND

Field

The present disclosure relates generally to a system and method for controlling the operation of switching devices in a power distribution network and, more particularly, to a system and method for controlling the operation of switching devices in a power distribution network, where the method determines new leader devices in response to opening and closing the switching devices for isolating a fault.

Discussion of the Related Art

An electrical power distribution network, often referred to as an electrical grid, typically includes a number of power generation plants each having a number of power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to a number of substations typically located within a community, where the voltage is stepped down to a medium voltage for distribution. The substations provide the medium voltage power to a number of three-phase feeders including three single-phase feeder lines that carry the same current, but are 120° apart in phase. A number of three-phase and single-phase lateral lines are tapped off of the feeder that provide the medium voltage to various distribution transformers, where the voltage is stepped down to a low voltage and is provided to a number of loads, such as homes, businesses, etc.

Periodically, faults occur in the distribution network as a result of various things, such as animals touching the lines, lightning strikes, tree branches falling on the lines, vehicle collisions with utility poles, etc. Faults may create a short-circuit that increases the load on the network, which may cause the current flow from the substation to significantly increase, for example, many times above the normal current, along the fault path. This amount of current causes the electrical lines to significantly heat up and possibly melt, and also could cause mechanical damage to various components in the substation and in the network. Many times the fault will be a temporary or intermittent fault as opposed to a permanent or bolted fault, where the thing that caused the fault is removed a short time after the fault occurs, for example, a lightning strike, and where the distribution network will almost immediately begin operating normally.

Fault interrupters, for example, reclosers that employ vacuum interrupters, are provided on utility poles and in underground circuits along a power line and have a switch to allow or prevent power flow downstream of the recloser. These reclosers detect the current and voltage on the line to monitor current flow and look for problems with the network circuit, such as detecting a fault. If fault current is detected the recloser is opened in response thereto, and then after a short delay closed to determine whether the fault is a temporary fault. If fault current flows when the recloser is closed, it is immediately opened. If the fault current is detected again or two more times during subsequent opening and closing operations indicating a permanent fault, then the recloser remains open, where the time between detection tests may increase after each test. For a typical reclosing operation for fault detection tests, about 3-6 cycles of fault current pass through the recloser before it is opened.

A sectionalizer is a self-contained, circuit-opening device used in combination with source-side protective devices, such as reclosers or circuit breakers, to automatically isolate faulted sections of an electrical distribution network. A faulted circuit indicator is a device that automatically detects and identifies faults in an electrical distribution network, but does not have switching capabilities to open a power line. These devices are typically distributed between and among the reclosers to provide a system for isolating smaller sections of the network in response to a fault. Faulted circuit indicators and sectionalizers rely on observing a sequence of fault currents and the presence and absence of voltage either to indicate the presence of a fault or count the number of reclosing attempts, and then perform circuit isolation sectionalizing when the maximum number of reclosing attempts has been reached. Existing power distribution circuit sectionalizers detect the passage of fault currents, including both the initial fault event and subsequent recloser-initiated events, as part of more elaborate fault isolation and restoration processes. These processes may include counting discrete intervals of fault current passage, or counting discrete intervals of voltage presence and absence.

Most power distribution networks typically have a radial configuration where a power source at one end of a feeder provides power to loads at the other end the feeder. A fault, downed conductor or loss of source in a distribution feeder will cause load sections between reclosers or other switching devices downstream of the power loss location to be unpowered. When this occurs, it is desirable to reconfigure the network by opening and closing some of the switching devices to redirect power to as many load sections as possible from other power sources while still meeting source capacity, line ampacity and voltage constraints. For example, the first normally closed switching device downstream of the power loss location is opened and a normally open switching device at the end of the feeder from the power source is closed to allow power from another power source to provide power to the loads downstream of the now open switching device. In some designs there are multiple normally open switching devices allowing power to be provided from multiple power sources.

The decision to reconfigure the switching devices to power the unpowered downstream loads without over-burdening the network should be made quickly, and with limited computational resources. However, opening and closing switching devices in a desirable manner is often a complex process requiring significant coordination between the switching devices. More specifically, when reconfiguring a distribution network to provide power to unpowered sections as described, it is desirable to coordinate all of the operations to ensure that no sources become overloaded, no unnecessary sections lose power and no unnecessary switching actions are performed. In a distributed restoration scheme, information messages are passed between the switching devices or between the switching devices and a central control center using a suitable communications scheme, such as a wireless radio or fiber optics. It is desirable to pass this information in as little time and number of messages as possible.

SUMMARY

The following discussion discloses and describes a system and method for controlling an operation of devices in a power distribution network. The network includes at least two power sources, a plurality of feeders and a plurality of switching devices positioned along the feeders and being in communication with each other, where the network is represented by a plurality of teams where each team includes one side of adjacent switching devices and loads and power line sections therebetween, and where a plurality of teams define divisions in the network and one of the switching devices in each division is assigned as a leader device. The method determines that there is a power loss in the network as a result of a fault and one or more of the teams is not receiving power and performs a switching process in one of the switching devices to prevent fault current from flowing to the fault. The method initiates a power restoration process to control the open and closed status of the switching devices to isolate the fault and performs the power restoration process by the leader device in the division that the fault is occurring that includes opening and closing switching devices so that power is provided to all of the teams except the team that the fault is in. The method reconfigures the divisions based on which switching devices are now open and selects new leader devices based on the reconfiguration of the divisions.

Additional features of the present disclosure will become apparent from the following description and appended claims, taken in conjunction with the accompanying drawings.

DETAILED DESCRIPTION OF THE EMBODIMENTS

Figure 1:
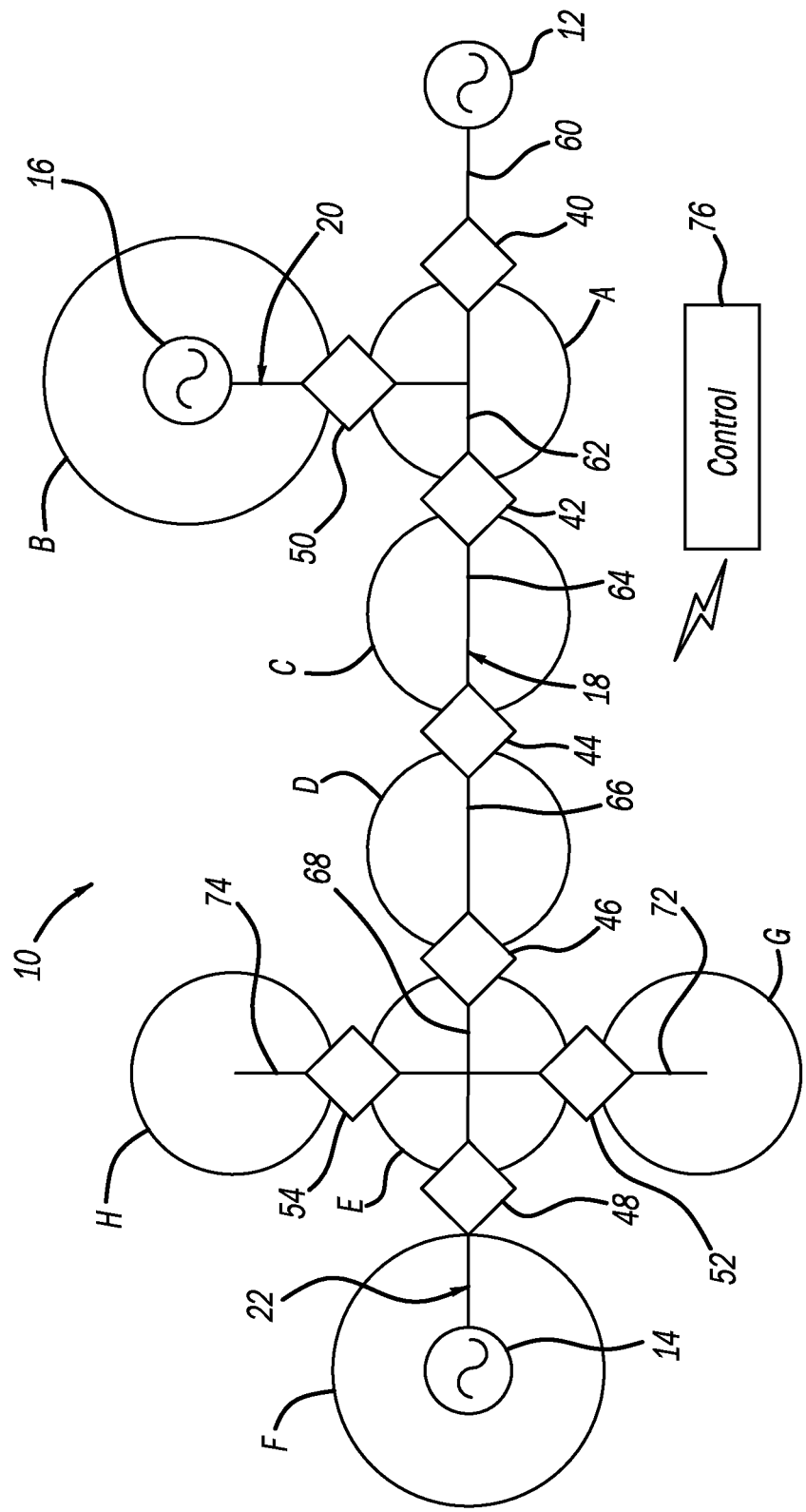
FIG. 1 is a simplified schematic illustration of an electrical power distribution network illustrating a radial network restoration process.

The following discussion of the embodiments of the disclosure directed to a system and method for controlling the operation of switching devices in a power distribution network, where the method determines new leader devices in response to opening and closing the switching devices for isolating a fault is merely exemplary in nature, and is in no way intended to limit the disclosure or its applications or uses.

This disclosure proposes a power restoration algorithm for restoring power to as many sections of a radial power distribution network as possible in response to loss of power, for example, from a fault, that will check all allowable electrical configurations of the network to find the most desired configuration, whereas heuristic approaches may lead to less ideal scenarios. The algorithm performs an exhaustive search that checks all possible solutions for reconfiguring the network to optimally deliver power to as many sections as possible, which becomes prohibitive when the number of solutions becomes very large, where a section is an electrically connected area bounded by switching devices. The algorithm builds the solutions in a way that only feasible configurations will be considered, thus substantially reducing the computation time. If the number of solutions becomes larger than the available memory or a defined time limit is reached before an optimal restoration solution is reached, a solution will still be produced and used, however, it may not be optimal.

The algorithm begins with a set of data knowledge of the network that includes network topology, capacity of sources, loads and other information and data that is used to characterize the validity and optimality of a restoration solution. From this data set, a depth first search (DFS) is performed from section to section in the network, where the DFS is started at each section defined as an independent source. As is well understood by those skilled in the art, a DFS is an algorithm for traversing or searching tree or graph data structures that starts at a selected root node, here a power source, and explores as far as possible along each branch of the structure before backtracking. The search performed from each source is independent from the searches performed by the other sources and can be run on a different processor if a parallel computing architecture is available. As the search traverses out from the source section, the capacity of the source is decremented by the amount of load in each section as well as the constraints of any devices that power has passed through, which limits the number of sections a source will try to connect to. The search will also stop if another source is reached because a radial solution cannot have multiple sources connected to the sections.

When a branch of the DFS cannot continue, it will begin building a possible solution by tracing its path back towards the source. While building the possible solutions on the reverse traversal of the sections, the search will wait at each section until all downstream branches complete their traversal back to the current section. This allows the accumulation of all load and configurations downstream of the current section. At this step the restrictions of the devices and other constraints can be checked on a subsection of the solution, which allows solutions to be eliminated that are not feasible. When the search ends back at the starting source, a full list of all of the sections and configurations that the source can support is obtained. Once a list of restoration solutions for each source is created, a solution from each source will be exhaustively combined. This full solution will be scored based on predetermined criteria, such as total load restored, smallest number of switching operations, etc. The highest scoring solution is then returned as the optimal configuration. It is noted that this approach can handle distributed generation (DG) on the network, where sections with DG sources are treated as negative load. It is further noted that in the discussion below, a team is defined as a section of powerlines bounded by switching devices and a division is defined as a group of teams that is powered by a single power source and could be electrically isolated from other divisions by normally open switching devices.

FIG. 1 is a simplified schematic type diagram of an electrical power distribution network 10 that employs distributed control consistent with the discussion herein, and can be used as an example to illustrate the restoration algorithm outlined above. The network 10 includes AC power sources 12, 14 and 16, such as electrical substations that step down high voltage power from a high voltage power line (not shown) to medium voltage power. The network includes a feeder 18 serviced by the source 12, a feeder section 20 serviced by the source 14 and a feeder section 22 serviced by the source 16. The network 10 also includes switching devices 40, 42, 44, 46, 52 and 54 positioned along the feeder 18, a switching device 50 positioned at the end of the feeder section 20, a switching device 48 positioned at the end of the feeder section 22, where the switching devices 40-54 can be any suitable device for the purposes discussed herein, such as reclosers, breakers, sectionalizers, etc. A section 60 of the feeder 18 is provided between the source 12 and the device 40, a section 62 of the feeder 18 is provided between the devices 40, 42 and 50, a section 64 of the feeder 18 is provided between the devices 42 and 44, a section 66 of the feeder 18 is provided between the devices 44 and 46, a section 68 of the feeder 18 is provided between the devices 46, 48, 52 and 54, a section 72 of the feeder 18 is provided off of the device 52 and a section 74 of the feeder 18 is provided off of the device 54.

The devices 40, 42, 44, 46, 52 and 54 are normally closed devices and the devices 48 and 50 are normally open devices so that the source 12 provides power to the sections 60, 62, 64, 66, 68, 72 and 74 and the sources 14 and 16 are prevented from providing power to those sections. For some network configurations referred to herein as closed loop, one or both of the switching devices 48 and 50 may be closed at the same time when the device 40 is closed. In the network 10, the combination of one side of the devices 40, 42 and 50 and the section 62 define Team A, the combination of the other side of the device 50, the feeder section 20 and the source 16 define Team B, the combination of one side of the devices 42 and 44 and the section 64 define Team C, the combination of one side of the devices 44 and 46 and the section 66 define Team D, the combination of one side of the devices 46, 48, 52 and 54 and the section 68 define Team E, the combination of the other side of the device 48, the source 14 and the section 22 define Team F, the combination of the other side of the device 52 and the section 72 define Team G, and the combination of the other side of the device 54 and the section 74 define Team H. As will be discussed in detail below, the topology, i.e., network configuration, will be known by all of the devices 40-54 by communications therebetween, where the topology of the network 10 will be automatically revised and updated as devices are removed and added to the network 10. A control center 76 may be in, for example, radio communication with the switching devices 40-54 that provides switching control consistent with the discussion herein.

Figure 2:
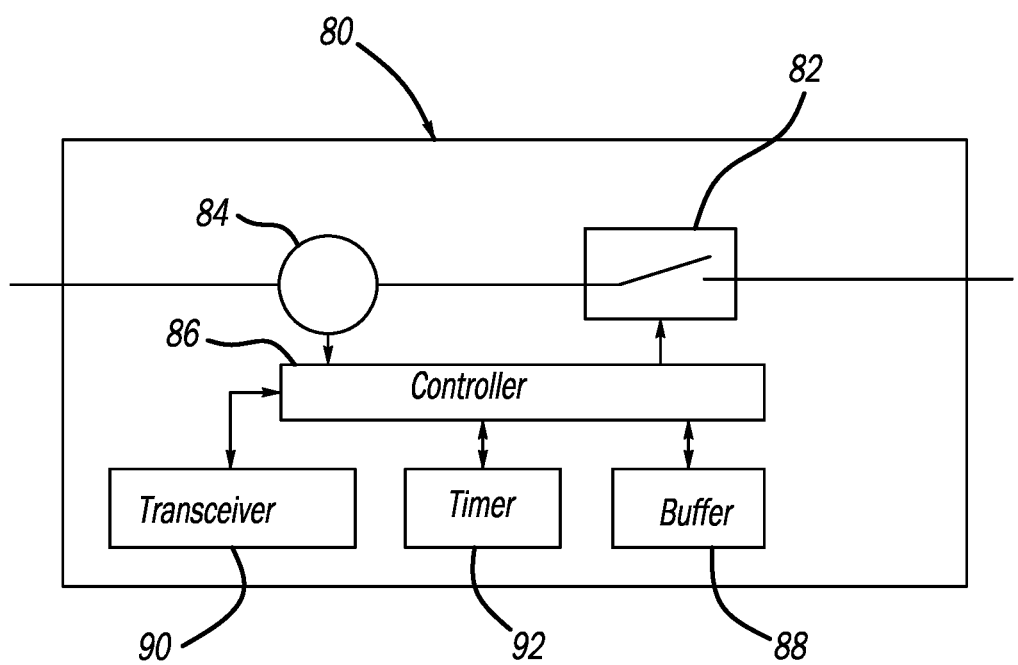
FIG. 2 is a simplified block diagram of a switching device.

FIG. 2 is a simplified schematic block diagram of a switching device 80 intended to be a non-limiting representation of any one of the switching devices 40-54 in the network 10, where the device 80 may include a switch 82, voltage/current sensors 84, a controller 86, a memory/buffer 88, a transceiver 90 and a timer 92.

The radial network restoration system and method described herein that provides an optimal configuration of the switches 40-54 to power all of the loads in the network 10 when the switch 40 is opened when, for example, there is a fault in the section 60 and the source 12 is unable to power the sections that are downstream of the switch 40 from the source 12. The restoration algorithm is performed in one of the switching devices 40-54, or the control center 76, who has been designated the leader device, discussed below, where the leader device is in communication with all of the other devices through any suitable communications protocol, such as radio transmissions, fiber optics, etc. First, the algorithm identifies how much power those teams with sources can provide and how much power those teams with loads need, where the switching devices 40-54 have stored data about how much load is on and power can be provided by each team. In this non-limiting example, the source 14 can provide 4 MW of power (Team F) and the source 16 can provide 3 MW of power (Team B). The loads in the Teams A, C, D, E, G and H each require 1 MW of power.

The restoration algorithm identifies all of the configurations or solutions where the switches 40-54 are selectively opened and closed so that power is provided to all of the Teams A, C, D, E, G and H without overloading the capacity of the sources 14 and 16, and where the algorithm allocates enough memory for $2^N$ restoration solutions, where N is the number of the switching devices being considered. The algorithm selects a source team, such as Team B, and performs the DFS, where the algorithm determines which combination of sections it is able to power in a radial manner. For example, the algorithm determines that Team B can power Team A with 2 MW of power left, and then Team A can power Team C with one MW of power to spare, and then Team C can power Team D with no power capacity left. The algorithm then traverses back from Team D to the source 16 identifying all of the possible restoration solutions, and from this it now knows that the source 16 can provide power to Team B; Teams B and A; Teams B, A and C; and Teams B, A, C and D as possible solutions.

The algorithm then selects Team F and performs the DFS, where the algorithm again determines which sections the source 14 is able to power in a radial manner. In this example, the algorithm determines that it can power Team E with 2 MW of power to spare, and then Team E can power Team D with 1 MW of power to spare and then Team D can power Team C with no capacity left. The algorithm then traverses back from Team C to the source 14 identifying the possible solutions, and it now knows that the source 14 can provide power to Team F; Teams F and E; Teams F, E and D; and Teams F, E, D and C as possible solutions. In the same manner, the algorithm also determines the other possible solutions for power from the source 14 as:

Teams F, E, H and D;
Teams F, E and G;
Teams F, E, H and G; and
Teams F, E, D and G.

The possible solutions for power from both of the sources 14 and 16 are then identified as:

Teams B and F;
Teams B, F and E;
Teams B, F, E and D;
Teams B, F, E, D and C;
Teams B, F, E, H and D;
Teams B, F, E and G;
Teams B, F, E, H and G;
Teams B, F, E, D and G;
Teams B, A and F;
Teams B, A, F and E;
Teams B, A, F, E and D;
Teams B, A, F, E, D and C;

Teams B, A, F, E, H and D;
Teams B, A, F, E and G;
Teams B, A, F, E, H and G;
Teams B, A, F, E, D and G;
Teams B, A, C and F;
Teams B, A, C, F and E;
Teams B, A, C, F, E and D;
Teams B, A, C, F, E, D and C;
Teams B, A, C, F, E, H and D;
Teams B, A, C, F, E and G;
Teams B, A, C, F, E, H and G;
Teams B, A, C, F, E, D and G;
Teams B, A, C, D and F;
Teams B, A, C, D, F and E;
Teams B, A, C, D, F, E and D;
Teams B, A, C, D, F, E, D and C;
Teams B, A, C, D, F, E, H and D;
Teams B, A, C, D, F, E and G;
Teams B, A, C, D, F, E, H and G; and
Teams B, A, C, D, F, E, D and G.

Those possible solutions that include two of the teams, specifically Team D and Team C are not allowed and are excluded because they would create a closed loop. The final possible list of solutions is then provided as:

Teams B and F;
Teams B, F and E;
Teams B, F, E and D;
Teams B, F, E, D and C;
Teams B, F, E, H and D;
Teams B, F, E and G;
Teams B, F, E, H and G;
Teams B, F, E, D and G;
Teams B, A and F;
Teams B, A, F and E;
Teams B, A, F, E and D;
Teams B, A, F, E, D and C;
Teams B, A, F, E, H and D;
Teams B, A, F, E and G;
Teams B, A, F, E, H and G;
Teams B, A, F, E, D and G;
Teams B, A, C and F;
Teams B, A, C, F and E;
Teams B, A, C, F, E and D;
Teams B, A, C, F, E, H and D;
Teams B, A, C, F, E and G;
Teams B, A, C, F, E, H and G;
Teams B, A, C, F, E, D and G;
Teams B, A, C, D and F;
Teams B, A, C, D, F and E;
Teams B, A, C, D, F, E and G; and
Teams B, A, C, D, F, E, H and G.

Those solutions are then analyzed to determine which one will be selected as the optimal solution based on predetermined selection criteria. The first and most important criteria is connecting load by predetermined priority, which includes the amount of load and any other customer specified priority, such as hospitals and other types of designated high priority loads. The analysis wants to make sure that those high priority loads are provided power. If there is more than one of the solutions having the same priority, then the next most important criteria can be, for example, the number of loads that are powered. Then, after removing those solutions that don't pick up the highest number of loads, and assuming there are still one or more solutions left, the next criteria can be, for example, the number of switching operations that need to be performed to provide the solution, where fewer switching operations is better. If more than one possible solution is still available after applying that criteria, the last criteria can be, for example, providing the best power source balancing. If there is more than one solution left after all of the criteria have been applied, then one of those solutions is selected at random. The solution selected in this example is Teams B, A, C, D, F, E, H and G and another algorithm is then initiated that provides the switching operation that includes opening the switching device 46 and closing all of the switching devices 40, 42, 44, 48, 50, 52 and 54 so that all of the sections 62-74 are powered.

As mentioned, the discussion above concerning the power restoration algorithm and process is for restoring power in radial networks. That algorithm can be extended to restoring power to as many sections as possible in closed-loop networks, where more than one source is connected to a load. As the radial restoration searches for possible restoration solutions from a source, the distance into a line that the search traverses is limited by the capacity of the source, i.e., once the loads in the teams use up the available power from the source, the search is stopped. However, the depth of a closed-loop restoration search does not have such a limit because the search must continue after the source has been depleted in case another source is reached at the end of the line. The closed-loop restoration algorithm virtually determines using a section-by-section basis the feasibility of powering load sections. This results in a new desired network configuration for the network restoration. The algorithm connects unpowered loads to one or more neighbor sections that were already connected to a source in previous steps. When connecting these load sections, the affected sections upstream are taken into consideration to ensure that capacity, ampacity, voltage and other constraints aren't violated.

In a typical distribution feeder, two types of sources are common, namely, constant voltage sources and controllable constant power sources. A constant power source that has a known or controllable setpoint does not require a power flow and can be used to pick up load sections with minimal computational effort. If there are multiple voltage sources, many factors play a role in the amount of output power from a given source, such as admittance and voltage angle, requiring a power flow to be run.

For the closed-loop restoration process, the full information about the network being connected is not necessary, where with equivalent admittance and voltage measurements, an equivalent of the network can be generated and used to greatly simplify the power flow calculations. Further, only network configurations with a high chance of success are calculated, thus avoiding the need to attempt a power flow for each possible way to power a section.

Figure 3:
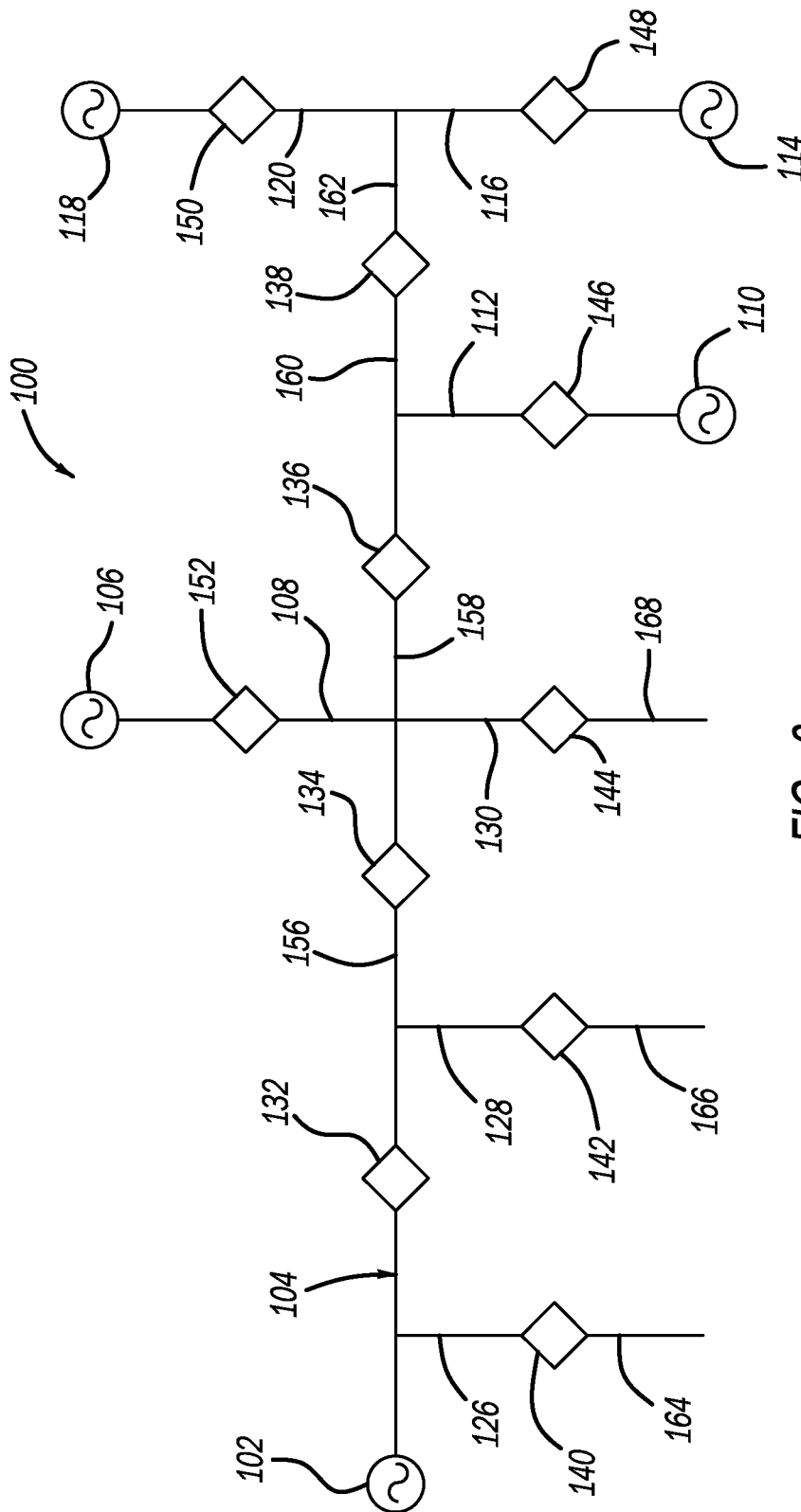
FIG. 3 is a simplified schematic type diagram of an electrical power distribution network illustrating a closed-loop network restoration process.

FIG. 3 is a simplified schematic type diagram of an electrical power distribution network 100 that is used below as a non-limiting example to describe the closed-loop restoration process referred to above. The network 100 includes a first main AC source 102 coupled to a primary feeder 104 and having a capacity of 45 MW, a second main AC source 106 coupled to a secondary feeder 108 that is coupled to the feeder 104, a first alternate AC source 110 coupled to a secondary feeder 112 that is coupled to the feeder 104 and having a capacity of 15 MW, a second alternate AC source 114 coupled to a secondary feeder 116 that is coupled to the feeder 104 and having a capacity of 25 MW, and a third alternate AC source 118 coupled to a secondary feeder 120 that is coupled to the feeder 104 and having a capacity of 2 MW. Secondary feeders 126, 128 and 130 are also coupled to the feeder 104, and switching devices 132, 134, 136 and 138 are provided along the feeder 104, a switching device 140 is provided in the feeder 126, a switching device 142 is provided in the feeder 128, a switching device 144 is provided in the feeder 130, a switching device 146 is provided in the feeder 112, a switching device 148 is provided in the feeder 116, a switching device 150 is provided in the feeder 120, and a switching device 152 is provided in the feeder 108. A section 156 having a load of 10 MW is defined between the devices 132, 134 and 142, a section 158 having a load of 10 MW is defined between the devices 134, 136, 144 and 152, a section 160 having a load of 10 MW is defined between the devices 136, 138 and 146, a section 162 having a load of 10 MW is defined between the devices 138, 148 and 150, a section 164 having a load of 10 MW is defined downstream of the device 140, a section 166 having a load of 10 MW is defined downstream of the device 142, and a section 168 having a load of 10 MW is defined downstream of the device 144. The switching devices 132, 140 and 152 are normally closed and the switching devices 146, 148 and 150 are normally open so that power is provided to the network 100 by both of the main sources 102 and 106 in a closed-loop manner and not by the auxiliary sources 110, 114 and 118 during normal operation. Further, in this non-limiting example, the device 132 has a restriction that a maximum of 27 MW of power, i.e., current, can pass through it.

If a fault occurs at or near the main source 106, the switching device 152 will perform a reclosing operation and eventually remain open if the fault remains so that the source 106 does not provide power to the network 100. The source 102 is still able to provide power to the network 100, but it does not have enough capacity to satisfy all of the loads in all of the sections 156, 158, 160, 162, 164, 166 and 168, i.e., 70 MW, and further only 27 MW of power can pass through the switching device 132. A radial restoration solution is first obtained before the closed-loop restoration algorithm is initiated, which can be obtained in the manner described above, or by brute force techniques, or by some other process that is known by those skilled in the art. For this example, the selected radial solution that is the most optimal closes the devices 146 and 148 and opens the devices 134, 136, 138 and 144 so that the sections 156, 166, 160 and 162 receive power from the sources 102, 110 and 114, but the section 158 does not receive power. It is noted that the source 102 has enough capacity to power the section 158, but it won't because of the restriction of the device 132. In other words, if the device 134 was closed to pick up the section 158, 30 MW of power would flow through the device 132, thus violating the restriction, so the radial restoration algorithm would not allow that as a solution.

Since there is additional capacity in the sources 102, 110, 114 and 118, the closed-loop restoration algorithm will be initiated in an attempt to power all of the sections. Generally, as will be described in detail below, the closed-loop restoration algorithm estimates the flow through each device in the current configuration for the radial solution, determines the available capacity from each device, determines if the unpowered teams or sections can be powered by any of their neighbor devices, determines if the unpowered teams or sections can be powered from distant devices, virtually closes the devices to power the unpowered teams, and then updates the flow estimates and available capacities.

For the selected radial solution, 20 MW of power flows through the device 132 to the sections 156 and 166, 10 MW of power flows through the device 140 to the section 164, 10 MW of power flows through the device 142 to the section 166, 10 MW of power flows through the device 146 to the section 160, 10 MW of power flows through the device 148 to the section 162 and 0 MW of power flows through the devices 134, 136, 138, 144 and 150. The algorithm finds the capacity that each device will be able to provide to a team or section next to it. Since the source 114 can provide 25 MW and 10 MW is used by the section 162, 15 MW is available to be provided to either the downstream side of the devices 138 and 150, but practically just to the section 160. Likewise, the source 110 could provide 5 MW of power that is not used by the section 160 to the section 158 through the device 136 or to the section 162 through the device 138, and the source 118 could provide 2 MW of power to the section 162. Further, the source 102 has 30 MW available that is not used by the sections 164, 166 and 156, but can only provide 7 MW to the section 158 because of the restriction on the device 132. The algorithm then identifies the secondary capacities of the devices, i.e., if an open device was to close, how much additional capacity would another device obtain, were identifying secondary capacities does not occur across unpowered sections. For example, if the device 150 were to close, then the section 162 would obtain 2 MW of additional capacity, and if the device 138 were to close, then the section 160 would obtain 5 MW of additional capacity and the device 136 would obtain 15 MW of additional capacity.

Since 7 MW can be provided by the device 134 and 5 MW can be provided by the device 136, those devices are virtually closed and power is virtually provided to the section 158, which uses 10 MW of that available power, and the flow estimates and available capacities are updated in each of the devices in the manner as discussed above. Now, the available capacity on the device 144 is 2 MW of power when the devices 134 and 136 are closed, which is not enough to power the section 168, which needs 10 MW of power. However, the algorithm knows that an additional 15 MW of power is available from the source 114 if the device 138 is closed. Thus, this solution is implemented and the devices 134, 136, 138 and 144 are actually and simultaneously closed, and power is delivered to the entire network 100, and the capacities and flow estimates are updated. It is noted that the closed-loop restoration algorithm may not identify the most optimal solution, but likely will identify a sufficient solution without checking every possible solution.

Figure 4:
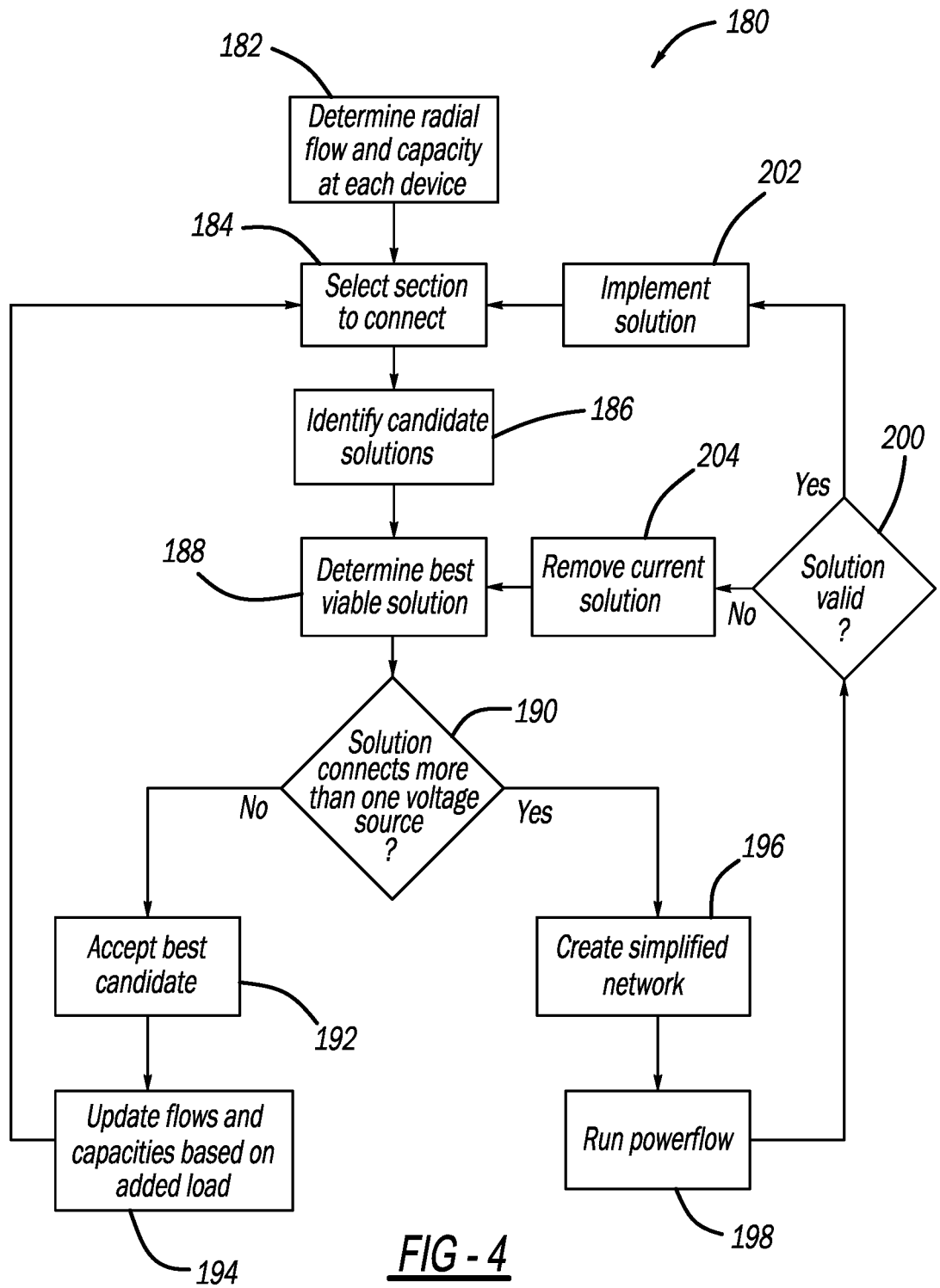
FIG. 4 is a flow chart diagram illustrating the closed-loop restoration process.

FIG. 4 is a flow chart diagram 180 illustrating the closed-loop restoration process as discussed above. The process begins with the network 100 in a radial topology where no voltage source is connected to another voltage source. Using a simple breadth first search (BFS), the algorithm estimates the load flow and additional capacity at each of the devices already connected to a power source at box 182. As is well understood by those skilled in the art, a BFS is an algorithm for traversing or searching a tree or graph data structure that starts at an arbitrary node of the graph and explores all of the neighbor nodes at the present depth prior to moving on to the nodes at the next depth level. Upon the completion of the BFS, the next step selects one of the unpowered sections to try and reconnect at box 184, which can be based on any suitable factors or user defined priority, such as load size, total capacity available to the section, etc. Once the algorithm selects an unpowered section, the various available combinations or solutions for closing the devices to power the section are identified and examined at box 186. With additional data determined during the BFS step, distant open devices can also be considered if closing them would increase the capacity of the open device connected to the section in question.

The best combination or solution that has enough capacity to power the selected section is selected at box 188, where, for example, the combinations or solutions are ordered by the number of required switching operations. Decision diamond 190 determines if this combination or solution connects only one additional voltage source, possibly to other constant power sources, and if so, that combination or solution is accepted as the new desired configuration at box 192. Estimates of the load flow and additional capacity at each of the devices now connected to a source are updated at box 194, and the process returns to the box 184 to select the next unpowered section. In this scenario, only an additional BFS is required to update the flows and capacities at the box 194.

If the accepted solution requires connecting more than one power sources at the decision diamond 190, that combination or solution is only considered as a candidate combination or solution. This is because the power flow resulting from connecting multiple voltage sources together cannot be predetermined with the information gathered, where the flows depend on phase angle, network impedance, etc. and requires a power flow calculation. To perform a computationally light power flow calculation, a simplified virtual network is constructed at box 196 using equivalent section admittances, source impedances, voltage and current measurements, and the equivalent admittance of adjacent feeders. Sections connected to multiple devices are modeled as multi-port edges. The operating voltage of known voltage sources is computed using the voltage and current measurements from the devices connected to the section in which the source resides, and the admittance of that section. Adjacent powered feeders, for which detailed information is not available, are modeled as an equivalent voltage source behind impedance using the minimal information available from the open device. The power flows are then computed on this simplified virtual network and the results are mapped back to the real devices in the network 100 at box 198. The algorithm determines whether the candidate combination or solution meets all of the requirements of source capacity, line ampacity and voltage constraints and is valid at decision diamond 200 and, if so, the solution is accepted and is implemented at box 202, and the process returns to the box 184 to select the next unpowered section. If the solution is not valid at the decision diamond 200, the solution is removed at box 204, and the algorithm returns to the box 188 to obtain the next best solution. Once a section is virtually powered, or all combinations to power that section have been exhausted, the algorithm stops. If any section is successfully connected, that triggers all of the previously checked sections to be processed once again.

As mentioned above, to ensure the coordination of the restoration efforts and processes, a leader device is selected for all of the switching devices in each division for steady state operation. During transitional periods a device can take on or relinquish leadership to other devices, through messaging, but each division will only have one leader device at any given time, except for open devices, which may have two leader devices. These open devices need to coordinate with both of the leader devices on either side of the device that are in different divisions. All requests for reconfiguration of a network will be calculated and executed by the leader device of that division. Anytime two divisions must interact with each other, such as closing an open tie device, both leader devices must agree to the plan before continuing. Upon reaching steady state, leadership will be passed between the devices as necessary to ensure only one leader device resides over a division.

In a distributed restoration scheme, each leader device will only have knowledge of a portion of the entire network. When a fault occurs, where two downstream sections need to be restored, these sections should be restored together to ensure a more optimal solution. When receiving a restoration request from a device, the leader device can analyze the division to see if there are additional sections that are expected to need restoring. If there are multiple sections expected to be restored, the leader device can wait a finite amount of time until all requests are processed and solve the restoration problem. When multiple devices need to operate to restore a section of the network, the operations need to be performed in certain steps so as to not violate network constraints during the transition. Devices are grouped into categories that can be operated together without violating constraints. These groups are then operated once the devices in the previous group confirm a successful operation. When an open device is commanded to close to repower a section, voltage must be present on the other side of the device to restore the power. However, closing devices may not have a voltage sensor on both sides. Upon receiving a permission request an open device will ensure voltage is on its other side. If the device is not capable of making the measurement, it will ask a neighbor device that has a sensor if voltage is present. If no voltage is detected at either time, the open device reports this back to the leader device, and the leader device removes the open device from consideration for closing.

During steady state, the capacity available from each open device changes and must be recalculated. As data propagates across the division, the available capacity can be calculated at each device according to its own constraints, and the capacity of the neighbor devices. Once the message reaches an open device, that device can send the equivalent capacity of itself to the neighbor division. When an open device receives a permission request to close, it must confirm with its leader device that it is clear to close on the other side. When a leader device receives a request to allow a device to close, it must check that there are no other activities going on in the division, and that the device has the required capacity to power the load on the other side. With the most up-to-date data, the leader device can decide that the network is in a steady state. Additionally, it can perform a capacity calculation and determine the device's capacity. This can be relayed back to the requesting leader device if there is not enough capacity to make a new calculation, so the requesting leader device can re-calculate its restoration effort.

Once the network is reconfigured, the leader device may no longer be connected, or it may not be the best candidate for leadership. A new leader device needs be elected that has the latest data to be ready for the next event. Whenever a leader device finishes a reconfiguration, it will calculate a new leader device for each new section created. It will send a leadership command to the new leader devices, as well as the latest relevant data.

When a device is closed or opened by a process outside of restoration, the leadership will have to be re-designated to match the new configuration of the network. When an open device is closed, it will contact the leader devices on both sides of it with information on the other leader device. Whichever leader device determines it is not the best fit it will transfer all of its data about the division to the other leader device. Conversely, when a device opens, it will contact its only leader device. The leader device will then elect a new leader device for the division on the side of the newly opened device that it does not reside. Multiple open devices may be shared by two divisions. When restoring one of these divisions, multiple of these open devices cannot be closed independently. The configuration of both sides of the open devices must be taken into consideration when multiple devices are closed. During steady-state operation, open devices broadcast to both leader devices the information about the sources to which they are connected on the other side. The broadcast messages also contain the information about power limitations for devices via which they are connected to those sources. This data is used to resolve the source inter-dependence among multiple open devices and allow for correct computation of available source capacity. When a section needs more power to reenergize than a neighbor division can provide and more capacity is requested than a neighbor division can provide, the leader device of the powered division can run a capacity calculation. This consists of adding a virtual load at the device that is connected to the unpowered section and running the normal restoration logic. If no section is dropped, and the virtual load is picked up, the division can be reconfigured to provide the needed capacity. If the virtual load cannot be picked up, the responding leader device can request more power from its powered neighbor divisions, following the same approach in a recursive manner up to a user configurable depth.

The improvements mentioned above allow for additional scenarios to be handled gracefully, when compared to the known power restoration techniques, where some of these scenarios are listed here as examples. When using multiple tie devices, if a single open device does not have enough capacity to power the whole division, the division will be broken down into multiple segments, each either being powered from a different open device, or left unpowered. In the event of multiple simultaneous faults, since all information is routed to a single leader device, all of the faults can be considered when solving the power restoration problem. With sequential fault events, since each leader device is always up to date on the state of the division it controls, each fault can be acted upon immediately and regardless of the initial state of the division. For load shifting, if a neighbor division does not have enough capacity to restore a division that is out of power, load sections can be shifted to adjacent divisions to allow the source to gain additional capacity to power the unpowered division.

During startup and periods of no activity, leader devices are elected for each division through a predetermined hierarchy of devices based on information periodically passed around. The responsibilities of the leader devices start when an event triggers a restoration process. An event trigger such as a restoration request from a device isolating a fault will cause a leader device to enter the process. Upon entering the process, the leader device will trigger a restoration calculation, where typically it will be decided which of the devices to open and close. Before any switching operations take place, the leader device must gain permission from the second leader device of any closing devices. By performing this first, no unnecessary opening operations are performed in the case a tie cannot close. For this, messaging will occur from the restoring leader device to the open device, then to the opposite leader device of the open device. Before forwarding the message to the opposite leader device, the open device will ensure voltage is present on the powered side of the device. When this is confirmed, the permission is forwarded. For the opposite leader device to confirm that an open device can close, it must ensure that closing the device will not cause any issues in its own division. If there are no other open devices set to close, and no events are taking place within the division, the leader device can issue a confirmation. The response of the opposite leader device is then transmitted back to the open device, then the restoring leader device. This ensures that both divisions that are involved are coordinated in the restoration effort.

In the case where multiple devices need to be closed, which connect to the same source on the powered side, the leader device on the restoring side can construct a virtual network to assess whether the source may become overloaded. This network is referred to as a virtual network because it is not a part of the connected division being restored.

The power restoration algorithm running in the leader device has the entire topology of its own division, but has very limited information about the neighbor division(s). The virtual network mechanism is a distributed algorithm that runs on both the bounding open devices, and on the restoring leader devices. The algorithm sends to the leader device of the neighbor division the information about the available power/capacity, sends to the leader device of the neighbor division the interconnections and power restrictions imposed for each open device considered in the restoration plan, sends the necessary information in a compact form to avoid broadcasting of the entire division's topology, and assembles the virtual network in the leader device that is used in assessing possible restoration solutions.

Once all of the permissions have been obtained by the restoring leader device, the devices can then be operated. These devices are grouped based on the network and their position to not violate any constraints during the transition. The grouping will depend on whether the restoration is due to a fault event or a capacity request. For a fault event, all of the opening devices are in a first group and all of the closing devices are in a second group. For a capacity request, all of the closing devices are in the first group and all of the opening devices are in the second group. To begin, all of the devices in the first occupied group are commanded to operate. Once all of the devices respond, or timeout, the leader device will advance the restoration process. If all of the devices operated successfully, the next group will be commanded to operate. If any device did not operate successfully, or a new event occurred within the restoring section, the restoration calculation will be re-run and the process started again. Upon completion of all of the devices which should operate, the leader device will designate the most appropriate new leader device for each division.

Periodically, open devices will send the capacity they have available. The immediate capacity, i.e., the amount which can be used from the source(s) in the neighbor division, is considered the first level of capacity. Additionally, the open device can calculate a hypothetical scenario where load in its own division can be shifted to adjacent powered divisions to find out what the most capacity available could be after executing the load shifting. This is considered the second level of capacity. The third level is like the second level, but it is assumed that the neighbor divisions are using their second level of capacity. In the case where a leader device calculates that no additional power is available in the surrounding divisions that can be used to pick up more load, but identifies that enough distant capacity may be available, a capacity request is sent. The mechanism will be like obtaining permission to close an open device, but the leader device on the other side of the open device will trigger its own restoration effort that can obtain the power needed for the requesting leader device. This process can be repeated at each leader device, allowing a division to retrieve power from several divisions away.

Figure 5:
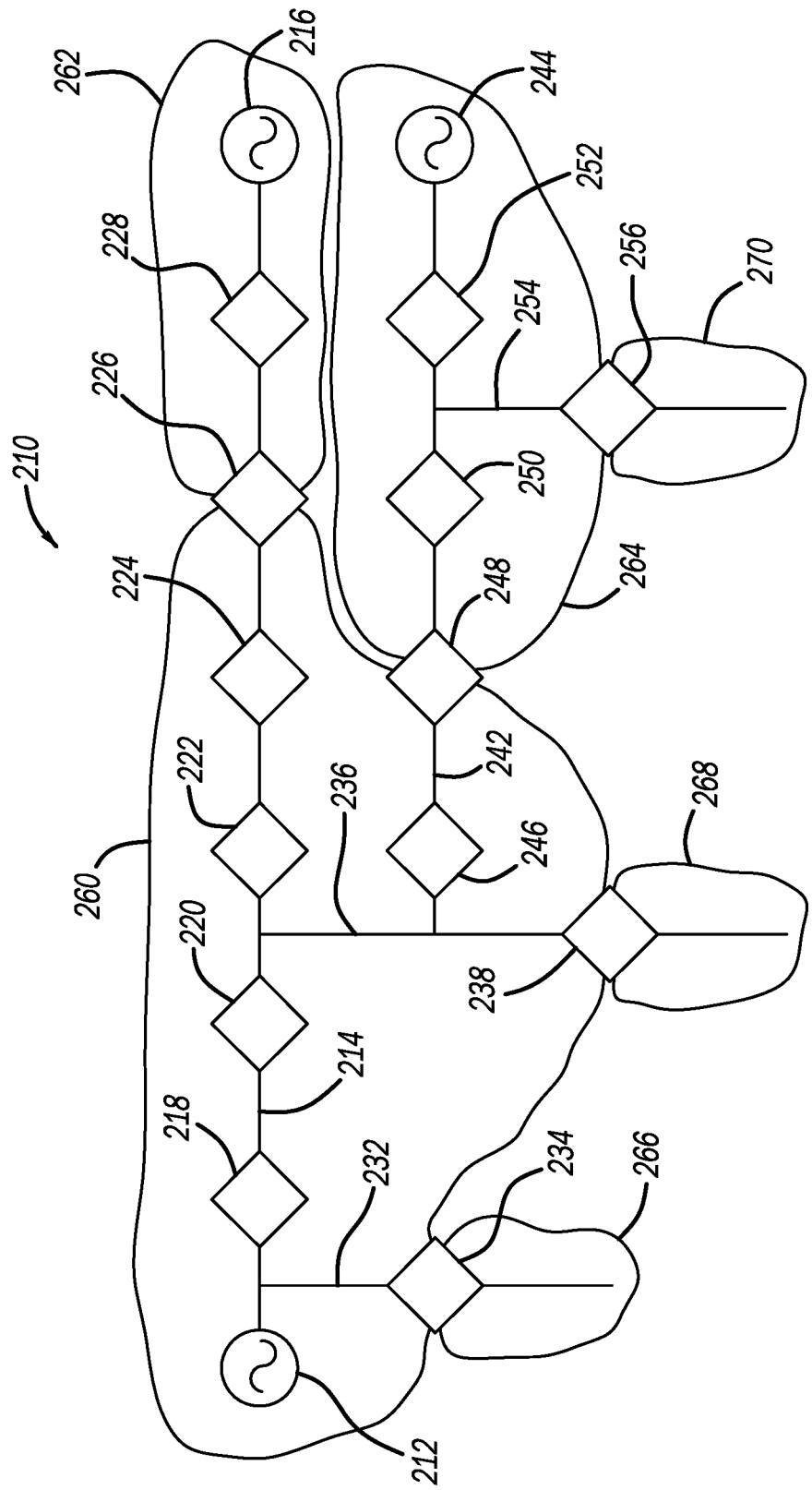
FIGS. 5-7 show variations of a simplified schematic type diagram of an electrical power distribution network illustrating a process for selecting a leader switching device.
Figure 6:
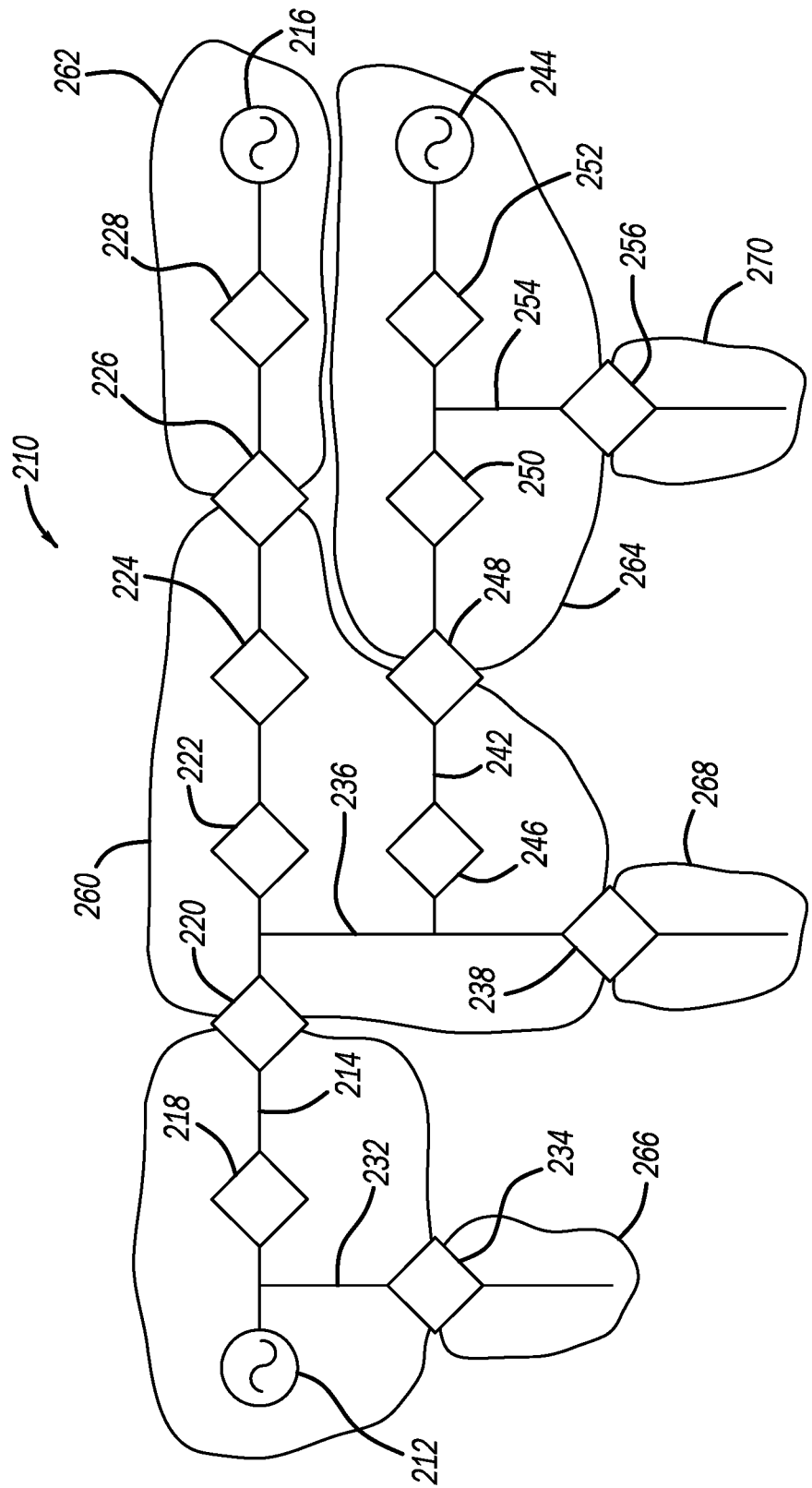
Figure 7:
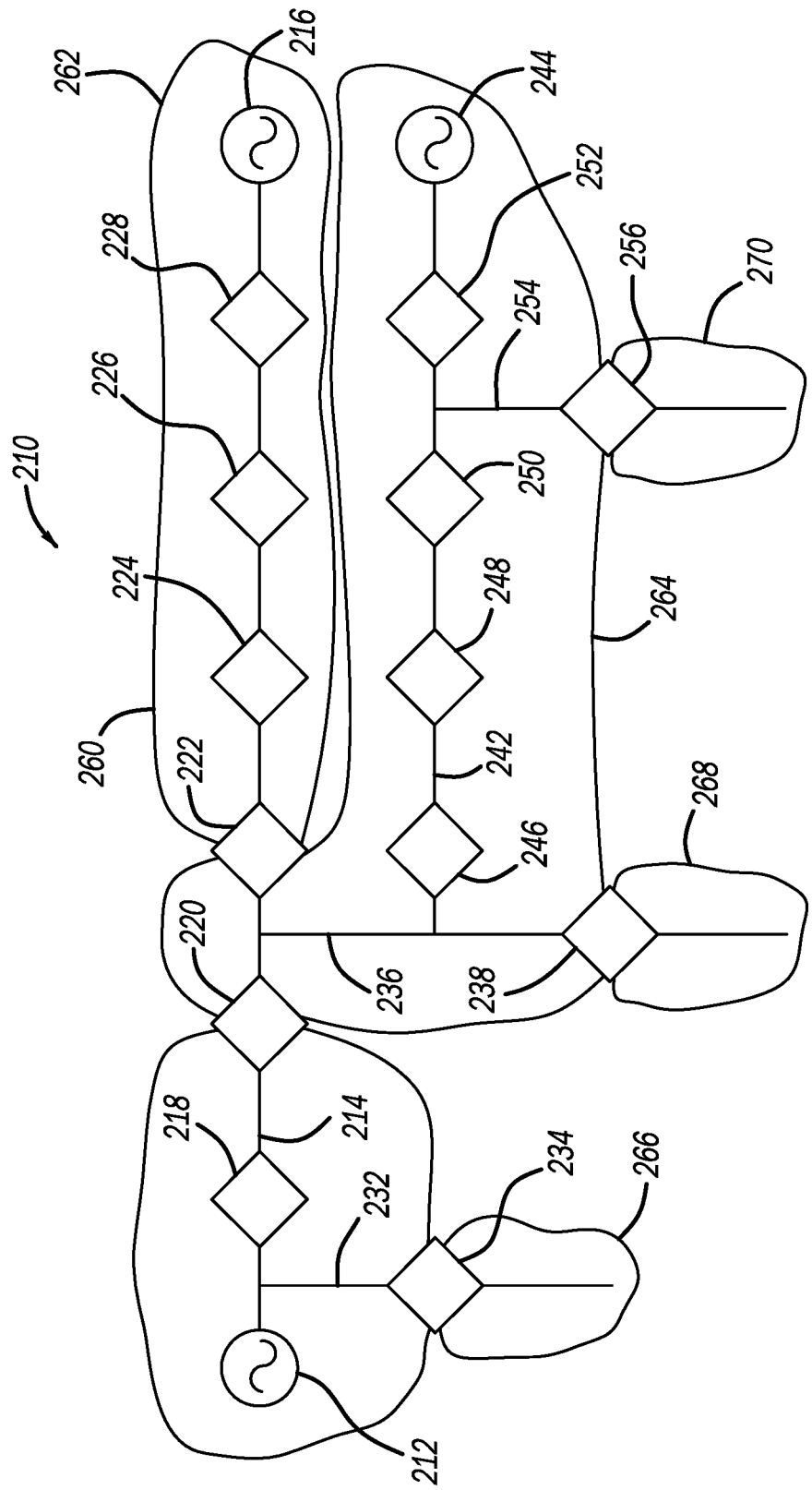

FIGS. 5, 6 and 7 are simplified schematic type diagrams of an electrical power distribution network 210 that is used below to describe a non-limiting example to illustrate how the process selects a leader device in the manner as discussed above. The network 210 includes an AC source 212 coupled to one end of a primary feeder 214 and an AC source 216 coupled to an opposite end of the feeder 214. A series of switching devices 218, 220, 222, 224, 226 and 228 are provided along the feeder 214, where the devices 218-224 and 228 are normally closed devices and the device 226 is a normally open device to electrically separate the sources 212 and 216. The network 210 also includes a secondary feeder 232 coupled to the feeder 214 and having a normally open switching device 234, and a secondary feeder 236 coupled to the feeder 214 and having a normally open switching device 238. The network 210 also includes a secondary feeder 242 coupled to the feeder 236 at one end and to an AC source 244 at an opposite end. A series of switching devices 246, 248, 250 and 252 are provided along the feeder 242, where the devices 246, 250 and 252 are normally closed devices and the device 248 is a normally open device to electrically separate the sources 212, 216 and 244. A secondary feeder 254 is coupled to the feeder 242 and includes a normally open switching device 256.

The normally open devices 226, 234, 238, 248 and 256 define electrically separated divisions 260, 262, 264, 266, 268 and 270 in the network 210. One of the devices in each division is initially designated as the leader device and all of the devices in the division know which one is the leader device. In this example, the device 238 is the leader device of the division 260, the device 226 is the leader device of the division 262, and the device 256 is the leader device of the divisions 264 and 270, where the leader devices of the divisions 266 and 268 are not shown.

If a fault occurs on the feeder 214 in, for example, the section between the devices 218 and 220, the device 218 will perform a reclosing operation for protection and the device 218 will eventually open if the fault remains, where power is cut off to the downstream sections being serviced by the source 212. The device 218 then messages the leader device 238 for the division 260 to request restoration by any suitable technique, such as those described above. The algorithm operating in the leader device 238 wants to isolate the fault between the devices 218 and 220 by also opening the device 220 and restore power to the sections in the division 260 downstream of the device 220. The algorithm operating in the leader device 238 determines which of the devices to open and close, in what order they are to be opened and closed, obtains permission from the other leader devices to open and close the devices, sends the commands to open and close the devices and transfers the leadership responsibility, if necessary. In this example, the device 238 obtains permission from the device 226 for it to close and from the device 256 for the device 248 to close and, if granted, commands the device 222 to open and then the devices 226 and 248 to close.

As shown in FIG. 6, the network 210 now has the configuration where the source 212 and the devices 218, 220 and 234 are in new division 400, the source 244 and the devices 220, 222, 238, 246, 246, 250, 252 and 256 are in new division 402, and the source 216 and the devices 222, 224, 226 and 228 are in new division 404. At this point, the device 238 is still the leader device of the division 400 because the device 218 is still going through the reclosing operation. Eventually the device 218 will lock open, and will message the device 238 requesting restoration. The device 238 will know that the restoration is already complete, and will separate section 406 from the division 400, as shown in FIG. 7. The device 238 will then pass leadership data to the device 234 for the division 400, the device 220 for the section 406, the device 256 for the division 402 and the device 222 for the division 404.

Figure 8:
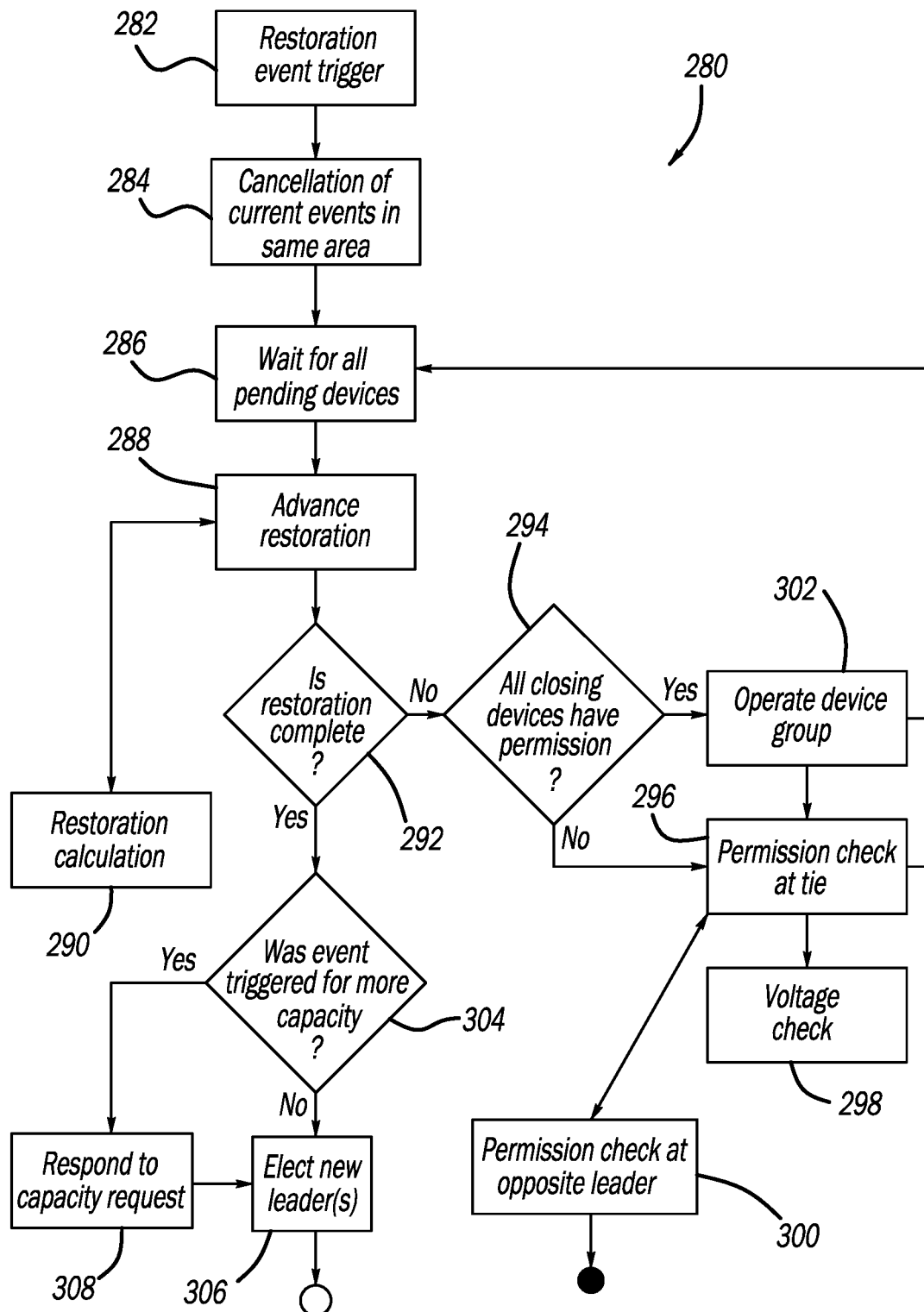
FIG. 8 is a flow chart diagram illustrating a process for identifying leader devices in the network shown in FIGS. 5-7.

FIG. 8 is a flow chart diagram 280 illustrating the algorithm, which is operating in a leader device of a division, discussed above for selecting leader devices. The algorithm starts at box 282 where an event is triggered, such as a fault, where all current events occurring in the network 210 are cancelled at box 284. At box 286, the algorithm waits for pending devices to send appropriate messages, which does not happen when the restoration event initially occurs. The algorithm then proceeds to perform the restoration process at box 288, where for a new event or if a device did not operate properly, the restoration calculations are performed at box 290 to determine what switching devices are operated and in what order, which in this example is open the device 222 and close the devices 226 and 248. The algorithm then determines if the restoration process is complete at decision diamond 292, which initially is no because the actual switching operation of the devices 222, 226 and 248 has not been performed yet. The algorithm determines if all of the devices that are to be closed have permission to close at decision diamond 294, which is initially no because the algorithm has not performed those steps yet either. The algorithm obtains permission to close the tie devices 226 and 248 between the divisions at box 296, which requires a voltage check on an opposite side of the tie devices from the fault at box 298, where the tie devices 226 and 248 contact the leader device in the adjacent division to obtain permission to close at box 300, and where the other leader devices may or may not allow the device to close. For example, if another fault is occurring in those divisions and the source was not available, the permission would be denied by the leader device.

Once the leader device 238 has permission or not the algorithm returns to the box 286 and the advance restoration box 288, where it is not a new event so no additional calculations are necessary, assuming that permission was given to open all of the closed devices. The restoration is still not complete at the decision diamond 292, but the devices to be closed do have permission at the decision diamond 294, and those devices are opened at box 302. The leader device 238 waits at the box 286 for messages that the device 222 has opened and the devices 226 and 248 have closed, and when that happens the restoration is complete at the decision diamond 292. When the restoration is complete at the decision diamond 292, the algorithm determines whether the event was triggered for more capacity at decision diamond 304, where in this case it is no because the event was triggered by a fault, so the algorithm proceeds to box 306 to select new leader devices for the new divisions 400, 402 and 404.

Figure 9:
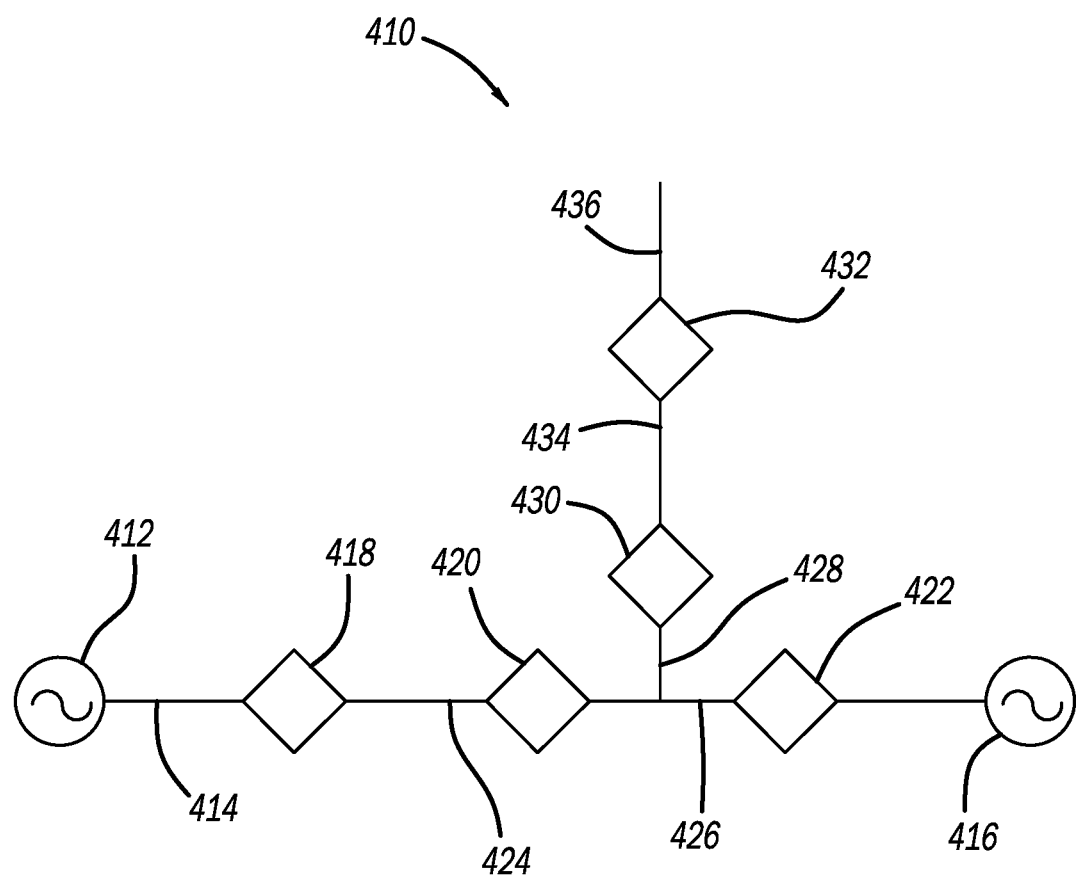
FIG. 9 is a simplified schematic type diagram of an electrical power distribution network illustrating how the process responds to a capacity request.

If the event was triggered for more capacity at the decision diamond 304, the algorithm moves to box 308 to respond to the capacity request. FIG. 9 is a simplified schematic type diagram of an electrical power distribution network 410 that is used below as a non-limiting example to illustrate how the process responds to this request. The network 410 includes an AC source 412 coupled to a feeder 414 at one end and an AC source 416 coupled to the feeder 414 at an opposite end, where the both of the sources 412 and 416 have a 10 MW capacity. Switching devices 418, 420 and 422 are provided along the feeder 414 and define sections 424 and 426, where the switching device 418 is normally open, the switching devices 420 and 422 are normally closed, the section 424 has a 3 MW load and the section 426 has a 2 MW load. A secondary feeder 428 is coupled to the section 424 and includes switching devices 430 and 432 defining sections 434 and 436 that are unpowered in this example, where the section 434 has a 6 MW load and the section 436 has a 1 MW load. The source 412 and the device 418 are in one division, the source 416 and the devices 420, 422 and 430 are in another division and the devices 430 and 432 are in another division, where the devices 418 and 430 are tie devices.

The source 416 only has 5 MW that is available after powering the sections 424 and 426, and therefore cannot power the sections 434 and 436 by closing the device 430. Restoration algorithms of the type discussed above are operated virtually in the leader devices to see if the source 412 division and the source 416 division can coordinate to provide the requested capacity. This restoration process identifies that if the device 420 is closed and the device 418 is opened, then the section 424 can be powered by the source 412 and 8 MW will be available at the device 430 for the sections 434 and 436, which is enough if the device 430 is opened.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for controlling an operation of devices in a power distribution network, said network including at least two power sources, a plurality of feeders and a plurality of switching devices positioned along the feeders and being in communications with each other, said network being represented by a plurality of teams where each team includes one side of adjacent switching devices and loads and power line sections therebetween, where a plurality of teams define divisions in the network and one of the switching devices in each division is assigned as being a leader device, said method comprising:
   determining that there is a power loss in the network and one or more of the teams is not receiving power;
   performing a switching process in one of the switching devices to prevent current from flowing to the power loss;
   initiating a power restoration process to control the open and closed status of the switching devices to isolate the power loss;
   performing the power restoration process by the leader device in the division that the power loss is occurring that includes opening and closing switching devices so that power is provided to all of the teams except the team that the power loss is in;
   reconfiguring the divisions based on which switching devices are now open; and
   selecting new leader devices based on the reconfiguration of the divisions.

2. The method according to claim 1 wherein initiating the power restoration process is in response to a fault or loss of source occurring in one of the teams.

3. The method according to claim 1 wherein initiating the power restoration process includes sending a message from the switching device performing the switching operation to the leader device performing the power restoration process.

4. The method according to claim 1 wherein performing the power restoration process includes obtaining permission by the leader device in the division that the power loss is occurring from other leader devices in other divisions to close normally open switching devices between adjacent divisions.

5. The method according to claim 4 wherein obtaining permission from other leader devices includes performing a voltage check to determine if voltage is present on a side of the normally open switching devices in the other divisions.

6. The method according to claim 1 further comprising terminating other events by the leader device in the division that the fault is occurring.

7. The method according to claim 1 wherein the switching devices are reclosers, sectionalizers or circuit breakers.

8. A method for controlling an operation of devices in a power distribution network, said network including at least two power sources, a plurality of feeders and a plurality of switching devices positioned along the feeders and being in communications with each other, said network being represented by a plurality of teams where each team includes one side of adjacent switching devices and loads and power line sections therebetween, where a plurality of teams define divisions in the network and one of the switching devices in each division is assigned as being a leader device, said method comprising:
   initiating a power restoration process to control the open and closed status of the switching devices to restore power to one or more of the divisions;
   performing the power restoration process by the leader device in the division that has lost power that includes opening and closing switching devices so that power is provided as many teams as possible;
   reconfiguring the divisions based on which switching devices are now open; and
   selecting new leader devices based on the reconfiguration of the divisions.

9. The method according to claim 8 wherein initiating the power restoration process is in response to a fault or loss of source occurring in one of the teams.

10. The method according to claim 8 wherein initiating the power restoration process includes sending a message from the switching device performing the switching operation to the leader device performing the power restoration process.

11. The method according to claim 8 wherein initiating the power restoration process is in response to a request for more power capacity in a division.

12. The method according to claim 8 wherein performing the power restoration process includes obtaining permission by the leader device performing the restoration process from other leader devices in other divisions to close normally open switching devices between adjacent divisions.

13. The method according to claim 12 wherein obtaining permission from other leader devices includes performing a voltage check to determine if voltage is present on a side of the normally open switching devices in the other divisions.

14. The method according to claim 8 further comprising terminating other events by the leader device performing the restoration process.

15. The method according to claim 8 wherein the switching devices are reclosers, sectionalizers or circuit breakers.

16. A system for controlling an operation of devices in a power distribution network, said network including at least two power sources, a plurality of feeders and a plurality of switching devices positioned along the feeders and being in communications with each other, said network being represented by a plurality of teams where each team includes one side of adjacent switching devices and loads and power line sections therebetween, where a plurality of teams define divisions in the network and one of the switching devices in each division is assigned as being a leader device, said system comprising:
- means for determining that there is a power loss in the network and one or more of the teams is not receiving power;
- means for performing a switching process in one of the switching devices to prevent current from flowing to the power loss;
- means for initiating a power restoration process to control the open and closed status of the switching devices to isolate the power loss;
- means for performing the power restoration process by the leader device in the division that the power loss is occurring that includes opening and closing switching devices so that power is provided to all of the teams except the team that the power loss is in;
- means for reconfiguring the divisions based on which switching devices are now open; and
- means for selecting new leader devices based on the reconfiguration of the divisions.

17. The system according to claim 16 wherein the means for performing a switching process performs a switching operation.

18. The system according to claim 16 wherein the means for initiating the power restoration process sends a message from the switching device performing the switching operation to the leader device performing the power restoration process.

19. The system according to claim 16 wherein the means for performing the power restoration process obtains permission by the leader device in the division that the fault is occurring from other leader devices in other divisions to close normally open switching devices between adjacent divisions.

20. The system according to claim 16 wherein the means for initiating the power restoration process is in response to a fault or loss of source occurring in one of the teams.

* * * * *